United States Patent [19]
Woodall

[11] Patent Number: 6,029,113
[45] Date of Patent: Feb. 22, 2000

[54] DIFFERENTIAL HYDROPHONE ASSEMBLY

[75] Inventor: Roger L. Woodall, Jewett City, Conn.

[73] Assignee: The United States of America as represented by the Secretary of the Navy, Washington, D.C.

[21] Appl. No.: 09/226,617

[22] Filed: Dec. 21, 1998

[51] Int. Cl.$^7$ ...................................................... G01V 1/00
[52] U.S. Cl. ........................................................ 702/1; 702/2
[58] Field of Search ........................... 367/20, 141, 159; 340/10, 25; 702/1, 2

[56] References Cited

U.S. PATENT DOCUMENTS

| | | | |
|---|---|---|---|
| 3,732,535 | 5/1973 | Ehrlich | 340/10 |
| 3,891,871 | 6/1975 | Henriquez et al. | 310/9.1 |
| 4,228,532 | 10/1980 | Sims | 367/159 |
| 4,928,264 | 5/1990 | Kahn | 367/141 |
| 5,477,504 | 12/1995 | Hagerty | 367/13 |
| 5,625,320 | 4/1997 | Hagerty | 330/2 |

*Primary Examiner*—Christine K. Oda
*Assistant Examiner*—Victor J. Taylor
*Attorney, Agent, or Firm*—Michael J. McGowan; Robert W. Gauthier; Prithvi C. Lall

[57] ABSTRACT

A differential hydrophone assembly includes a ceramic hydrophone for disposition in a water environment and comprising first and second hemispherical piezoelectric sections, a polarized ceramic member disposed in each section, a positive electrode and a negative electrode disposed in each section, an output conductor extending from each of the electrodes, such that a first pair of the conductors extend from a first of the ceramic members, and a second pair of the conductors extend from a second of the ceramic members, the first pair of conductors being discrete from the second pair of conductors. The assembly further includes a differential summing amplifier for disposition in a second environment removed from the water environment and electrically connected to the first and second pairs of conductors. The assembly is adapted to sum acoustic signals produced by changes in pressure in the water environment and transform the acoustic signals into two electrical signals of opposite polarities from which common mode noises are nulled to provide a differential hydrophone output.

3 Claims, 4 Drawing Sheets

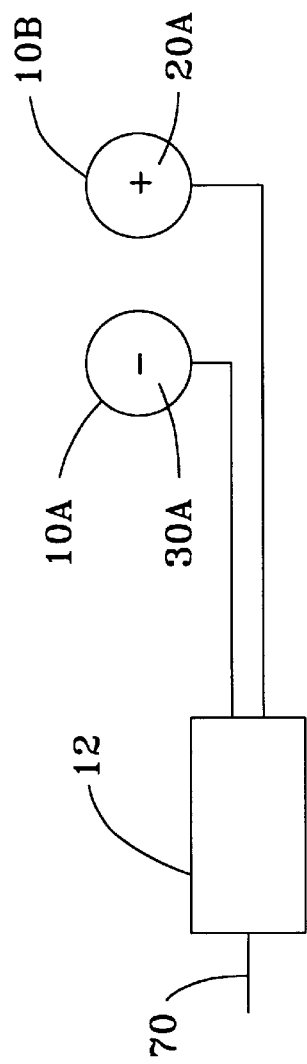
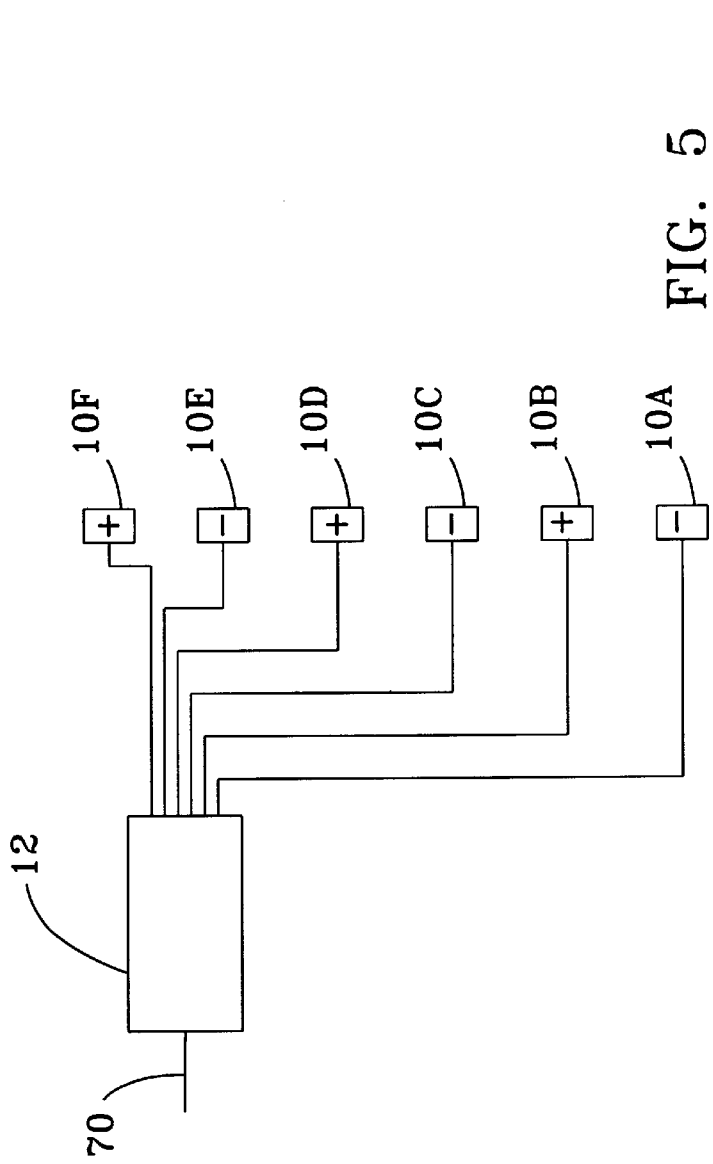

DIFFERENTIAL HYDROPHONE ASSEMBLY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The invention relates to hydrophones and is directed more particularly to a differential hydrophone assembly for transforming acoustic waves into electrical signals without undue sensitivity to common mode noise.

(2) Description of the Prior Art

Hydrophone assemblies historically have included a piezoelectric hydrophone electrically connected to a hydrophone amplifier. As ships and SONAR systems became larger, the amplifiers were placed remotely from the hydrophones and connected to the hydrophones by way of long cables which suffered signal loss. To reduce the signal loss a first stage (preamplifier) of the amplifier was moved closer to the hydrophone. More recently, a differential input preamplifier has been developed to reduce the effect of common mode noise. In common SONAR environments electric and electronic devices produce electric and magnetic (EM) fields that produce common mode noise on a ground reference of a SONAR system, while the water environment of the hydrophone is relatively quiet and unaffected by EM field generated noise.

Although the historical hydrophone assembly configurations have not changed substantially in over fifty years, the SONAR electronics and other shipboard electronics have become quite complex and have become a major source of electromagnetic interference (EMI). The EMI has corrupted the ground reference to the amplifier, producing a large common mode noise on the reference ground plane. This common mode noise is reflected to the input of the amplifier, such that even a differential preamplifier is affected by the presence of the common mode noise.

Further, prior art hydrophones include a substantially annular ceramic member with a positive electrode on an external surface thereof and a negative electrode on an internal surface thereof. This configuration produces an unbalanced common mode current and reduces the amplifier capability to reject common mode noise. The amplifier cannot fully null the common mode noise.

Accordingly, there is a need for a differential hydrophone assembly which nulls common mode noise and generates an electric signal with a high degree of immunity to EM fields.

SUMMARY OF THE INVENTION

With the above and other objects in view, as will hereinafter appear, a feature of the present invention is the provision of a differential hydrophone assembly including a ceramic hydrophone for disposition in a water environment and comprising first and second hemispherical piezoelectric sections, a polarized ceramic member disposed in each of the sections, a positive electrode and a negative electrode disposed in each of the sections, and an output conductor extending from each of the electrodes, such that a first pair of the conductors extend from a first of the ceramic members, and a second pair of the conductors extend from a second of the ceramic members, the first pair of conductors being twisted together and the second pair of conductors being twisted together and discrete from the first pair of conductors. The assembly further includes a differential summing amplifier for disposition in a second environment removed from the water environment and electrically connected to the first and second pairs of conductors. The assembly is adapted to sum acoustic signals produced by changes in pressure in the water environment and transform the acoustic signals into two electrical signals of opposite polarities from which the common mode noises are nulled to provide a differential hydrophone output.

In accordance with a further feature of the invention, there is provided a differential hydrophone assembly comprising a first ceramic hydrophone for disposition in a water environment, the first ceramic hydrophone containing a positively charged ceramic member, a second ceramic hydrophone for disposition in the water environment, the second ceramic hydrophone containing a negatively charged ceramic member, and a differential summing amplifier in electrical communication with the first and second ceramic hydrophones by way of output conductors extending from the hydrophones to the amplifier, the assembly being adapted to sum acoustic signals and transform the acoustic signals into two electrical signals of opposite polarities from which the common mode noises are nulled to provide a differential hydrophone output.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent, wherein corresponding reference characters indicate corresponding parts throughout the several views of the drawings, and wherein:

FIGS. 4 and 5 are diagrammatic illustrations of alternative embodiments of assemblies.

DESCRIPTION OF THE PREFERRED EMBODIMENT

Figure 1:
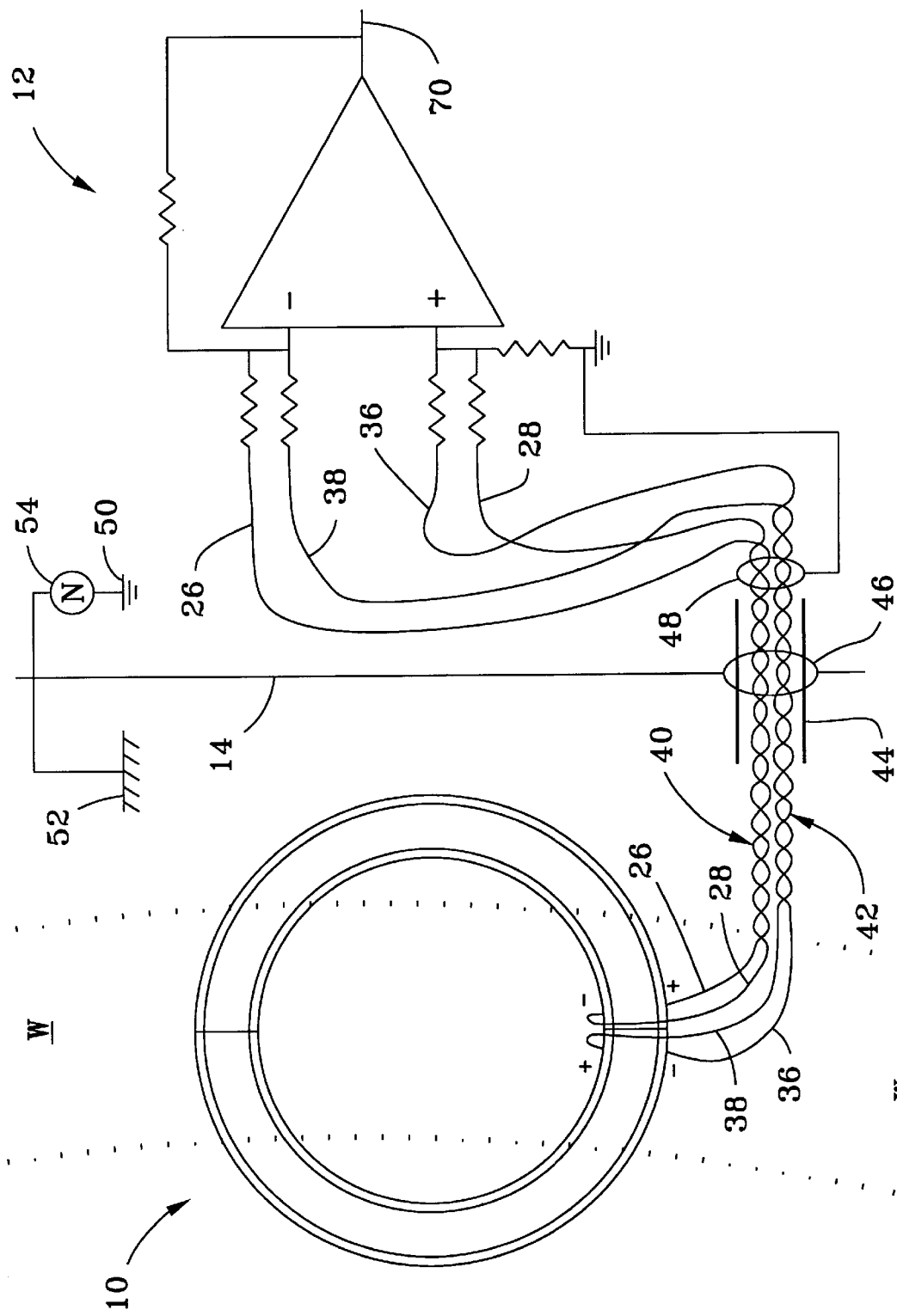
FIG. 1 is a schematic representation of a differential hydrophone assembly illustrative of an embodiment of the invention.

Referring to FIG. 1, it will be seen that an illustrative embodiment of the differential hydrophone assembly includes a hydrophone 10 and a hydrophone cancellation and summing amplifier 12. In use, hydrophone 10 is disposed in a water environment W and amplifier 12 is disposed onboard ship removed from water environment W and protected therefrom by a bulkhead or hull 14.

Figure 2:
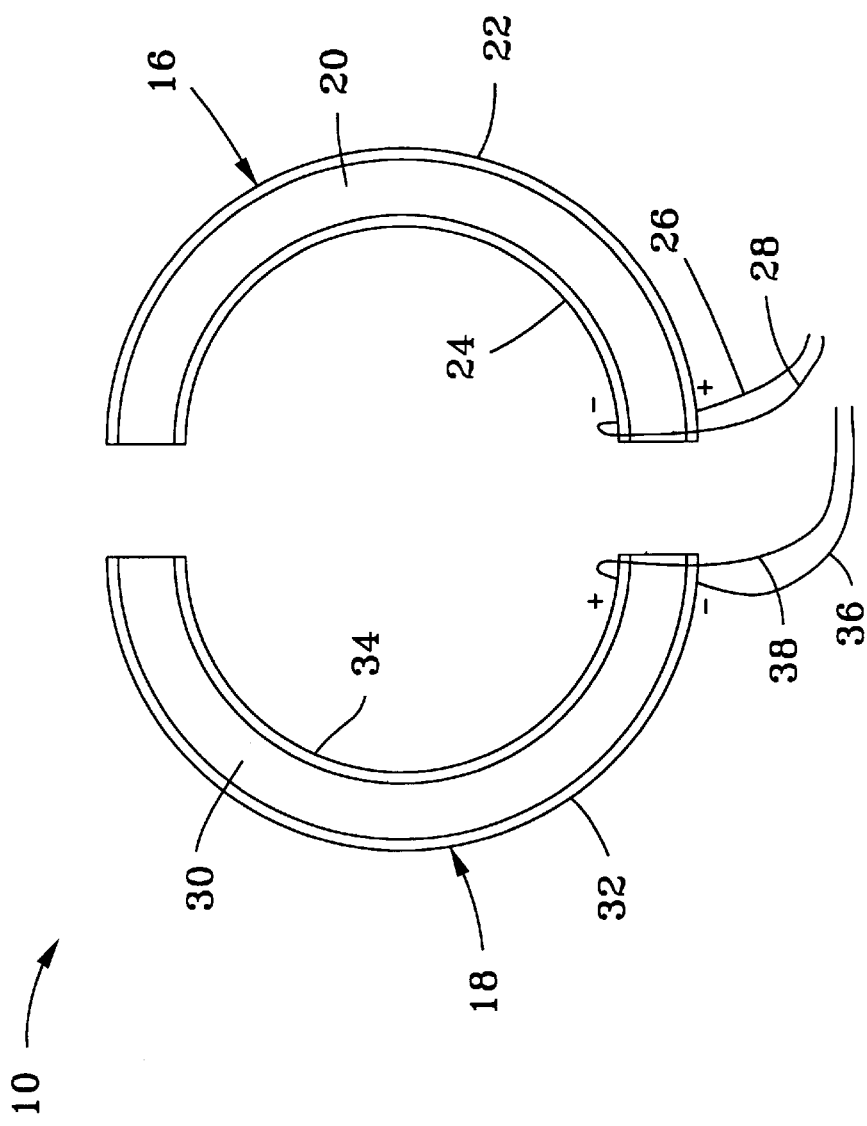
FIG. 2 is a diagrammatic illustration of portions of the assembly of FIG. 1.

Referring now also to FIG. 2, it will be seen that hydrophone 10, which is spherical in configuration, includes two hemispherical piezoelectric sections 16, 18. The piezoelectric section 16 contains a polarized ceramic member 20, an external surface which serves as a positive electrode 22, an internal surface which serves as a negative electrode 24, and output conductors 26, 28.

Similarly, the piezoelectric section 18 contains an oppositely polarized ceramic member 30, an external surface which serves as a negative electrode 32, an internal surface which serves as a positive electrode 34, and output conductors 36, 38.

Thus, each polarized ceramic member 20, 30 is of a different polarization. The positive hemisphere 16 contains a positive polarized ceramic member 20, which produces a positive voltage on the electrode 22 when under strain of an increased pressure above local ambient pressure in the water environment W. The ceramic polarization is in a radial direction between the electrodes 22, 24. The negative hemisphere 18 produces a negative voltage on the outer electrode 32 under the same conditions. The two hemispheres 16, 18 are joined together to form the hydrophone 10 (FIG. 1) and are in communication with amplifier 12 by way of the conductors 26, 28, 36, 38.

Connnectors 26, 28 are twisted together, as are connectors 36, 38, one set 40 of twisted conductors 26, 28 being discrete from the other set 42 of twisted conductors 36, 38. The two sets 40, 42 of twisted conductors typically are bundled in a cable 44 which is passed through a hull penetrating seal 46 in the hull 14 and is covered in part by a shield 48, shown diagrammatically in FIG. 1.

In FIG. 1, there is illustrated diagrammatically reflection of the common mode noise from a ground 50 of a shipboard electronic circuit to the water environment W. A common mode noise 54 is electrically connected between the electronic circuit ground 50 and a water ground 52.

Figure 3:
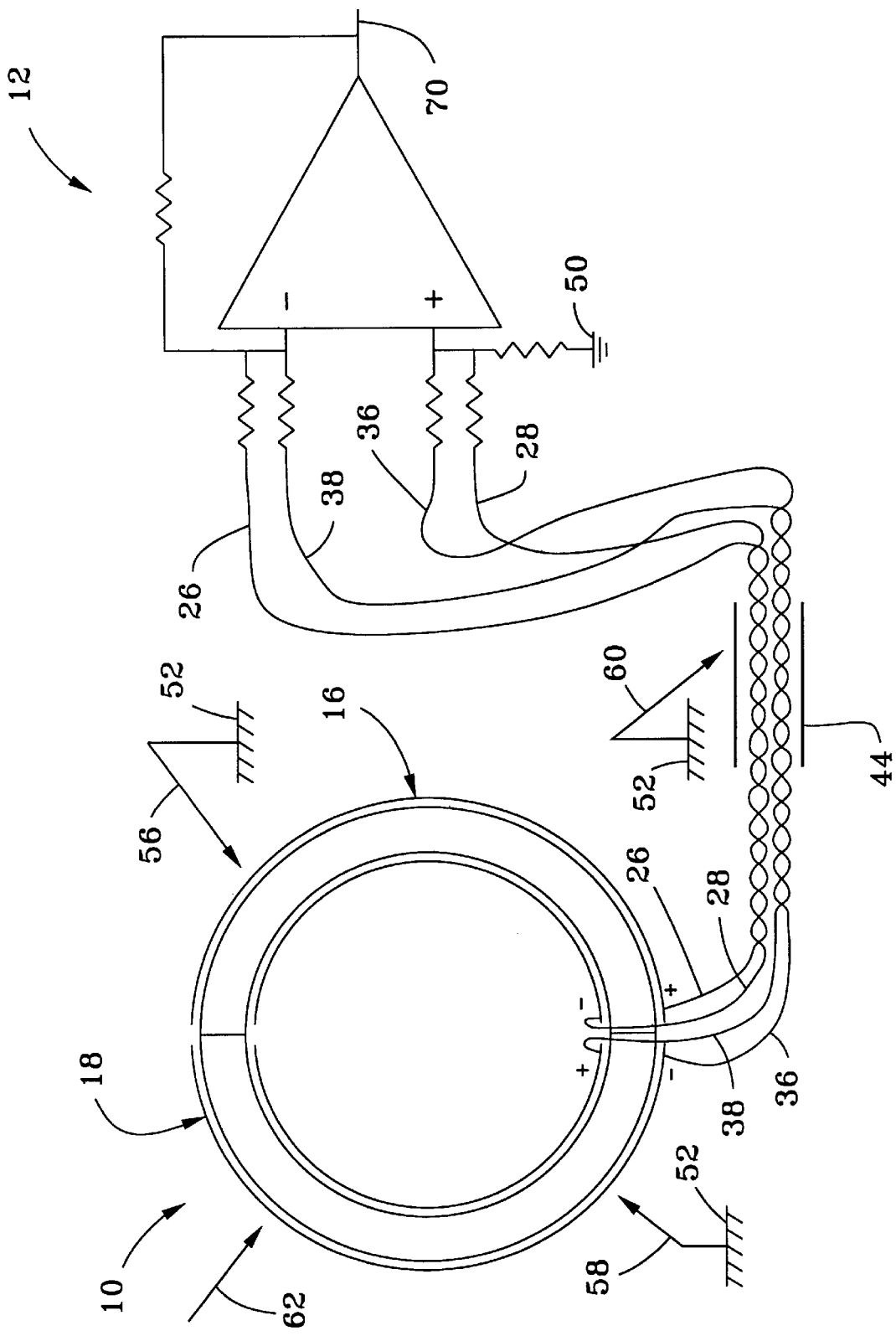
FIG. 3 is similar to FIG. 1 but diagrammatically illustrative of the assembly acted upon by outside factors.

Referring to FIG. 3, common mode noise 54 is represented by vectors 56, 58 and 60. An acoustical wave, caused by pressure changes relative to an ambient water pressure, is represented by vector 62.

Still referring to FIG. 3, the amplifier 12 is a differential summing amplifier which nulls common mode noise 56, 58 which has been electrically coupled into hydrophone 10 and sums the acoustic signals produced by the water pressure changes 62 and which is transformed into two signals of opposite polarities. The two hydrophone hemispheres 16, 18 each produce a differential voltage output as input to amplifier 12. Identical common mode noise potentials 56, 58 are capacitively coupled into the respective hemispheres 16, 18 and are applied to the differential input of amplifier 12 where one potential is substrated from the other by nulling the common mode noise 54 from the acoustic signal 62 to provide a differential hydrophone output 70. A twisted pair cable 44 exhibits a natural balance to the common mode noise potential 60.

Referring to FIG. 4, it will be seen that in an alternative embodiment, two discrete spherical hydrophones 10A and 10B are employed. Each hydrophone is polarized oppositely relative to the other. The positive hydrophone 10B contains a positive polarized ceramic member 20A and the negative hydrophone 10A contains a negative polarized ceramic member 30A. The hydrophones 10A, 10B are connected to amplifier 12 in the same manner as described above. The amplifier 12 produces a sum of the acoustic signal and a null of the common mode noise, to provide the differential hydrophone output 70.

Multiple pairs of reversely polarized ceramic hydrophones 10A–10F may be used in conjunction with amplifier 12, as illustrated diagrammatically in FIG. 5.

There is thus provided a differential hydrophone assembly which nulls common mode noise at the front end of the signal processing path and provides an electric signal output relatively unaffected by EM fields.

It will be understood that many additional changes in the details, materials and arrangement of parts, which have been herein described and illustrated in order to explain the nature of the invention, may be made by those skilled in the art within the principles and scope of the invention as expressed in the appended claims.

What is claimed is:

1. A differential hydrophone assembly comprising:

first and second hemispherical piezoelectric sections for disposition in a water environment and spaced from a vessel on which the assembly is mounted;

a polarized ceramic member disposed in each of said sections, a first of said ceramic members having an external surface exposed to the water environment and which serves as a positive electrode and an internal surface which serves as a negative electrode, and a second of said ceramic members having an external surface exposed to the water environment and which serves as a negative electrode and an internal surface which serves as a positive electrode, said first ceramic member producing a positive voltage on said positive electrode when under strain of increased pressure above local ambient pressure in the water environment, and said second ceramic member producing a negative voltage on said negative electrode when under strain of increased pressure;

an output conductor extending from each of said electrodes, such that a first pair of said conductors extend from said first of said ceramic members, and a second pair of said conductors extend from said second of said ceramic members, said first pair of conductors being twisted together to form a first set of twisted conductors and said second pair of conductors being twisted together to form a second set of twisted conductors discrete from said first set of twisted conductors; and a differential summing amplifier for disposition in a second environment removed from the water environment and electrically connected to said first and second sets of conductors, said assembly being adapted to sum acoustic signals produced by changes in pressure in the water environment, and transform said acoustic signals into two electrical signals of opposite polarities from which common mode noises from a around of an electronic circuit onboard the vessel electrically coupled into said assembly are nulled to provide a differential hydrophone output.

2. The assembly in accordance with claim 1 wherein:

said first and second pairs of output conductors are bundled in a cable; and said water environment and said second environment are separated by a bulkhead, said cable extending through a seal fixed in a penetration in said bulkhead.

3. The assembly in accordance with claim 2 wherein said cable exhibits a natural balance to common mode noise.

* * * * *